United States Patent [19]

Kuwashima

[11] Patent Number: 5,640,734
[45] Date of Patent: Jun. 24, 1997

[54] HOLLOW MEMBER CLEANING DEVICE

[75] Inventor: Kinuji Kuwashima, Hamamatsu, Japan

[73] Assignee: Kyokuto Rubber Co., Ltd., Sakai, Japan

[21] Appl. No.: 550,837

[22] Filed: Oct. 31, 1995

[30] Foreign Application Priority Data

Nov. 25, 1994 [JP] Japan ................................. 6-291057

[51] Int. Cl.⁶ ........................................................ B08B 9/04
[52] U.S. Cl. .................... 15/3.5; 15/104.061; 15/104.062
[58] Field of Search ........................... 15/3.5, 3.51, 3.52, 15/104.061, 104.062, 104.063

[56] References Cited

U.S. PATENT DOCUMENTS

| 616,696 | 12/1898 | Cochran | 15/3.51 |
|---|---|---|---|
| 804,592 | 11/1905 | Fink | 15/104.061 X |
| 1,715,442 | 6/1929 | Weis | 15/3.5 |
| 1,808,870 | 6/1931 | Strasburg | 15/3.5 |
| 1,814,766 | 7/1931 | Oberhuber | 15/3.5 |
| 1,867,751 | 7/1932 | Oberhuber | 15/3.5 |
| 2,623,226 | 12/1952 | Jones et al. | 15/104.062 |
| 3,218,659 | 11/1965 | Rowley | 15/104.061 |
| 3,265,083 | 8/1966 | Sachnik | 15/104.062 X |
| 4,111,229 | 9/1978 | Christian | 15/104.062 X |
| 5,103,524 | 4/1992 | Vowles | 15/3.51 |

FOREIGN PATENT DOCUMENTS

| 52-16873 | 2/1977 | Japan | 15/3.51 |
|---|---|---|---|
| 58-16199 | 1/1983 | Japan | 15/104.061 |
| 28866 | 1/1933 | Netherlands | 15/104.062 |

*Primary Examiner*—Mark Spisich
*Attorney, Agent, or Firm*—Kanesaka & Takfuchi

[57] ABSTRACT

Apparatus and method of the invention are used for cleaning a hollow member such as a heat exchanger. A cleaning device is formed of a cleaning member holding section having a transfer passage for receiving cleaning members therein, a cleaning member guide, a fluid introduction guide having a passage for introducing a fluid, and a direction changing member. The cleaning member guide has a guide passage for guiding one of the cleaning members into the hollow member, and an inserting portion formed at the front end to be inserted into the hollow member. The direction changing member is connected to the transfer passage, the rear end of the cleaning member guide and the fluid introduction guide and includes a receiving portion therein. The direction changing member selectively takes a first or second position. In the first position, the receiving portion is communicated at one end with the transfer passage and is closed at the other end thereof, and in the second position, the receiving portion is communicated at one end with the guide passage and at the other end with the fluid introduction guide. When the pressurized fluid is supplied in the second position to the cleaning member, the cleaning member in the receiving portion is ejected to the hollow member through the guide passage to clean the hollow member.

5 Claims, 11 Drawing Sheets

HOLLOW MEMBER CLEANING DEVICE

BACKGROUND OF THE INVENTION AND RELATED ART STATEMENT

The present invention relates to a hollow member washing or cleaning device such as a heat exchanger, wherein workability has been improved.

In a hollow member, such as a heat exchanger or condenser where steam discharged from a nuclear power plant, a thermal power plant and so on is cooled to change to water again for reuse, substances, such as furs, adhere to an inner wall of a pipe, so that efficiency of the heat exchanger is lowered. Therefore, the heat exchanger has to be periodically washed or cleaned.

As a heat exchanger washing device for washing a heat exchanger of this type, a tortuous pipe of the heat exchanger is opened to form a plurality of straight portions, and a washing member or brush in an approximately cylindrical shape is inserted for each straight portion by hand one by one. Then, high pressure water is applied to a rear portion of the washing brush to thereby run or move the washing brush inside the pipe for discharging the substances adhered to the inner wall of the pipe to the outside.

However, in the conventional heat exchanger washing device, since the washing brush is inserted by hand one by one into the straight portions of the pipe of the heat exchanger, work is very troublesome and work efficiency is lowered. Moreover, since many workers are required, large personnel expenses are increased.

Particularly, since work in a nuclear power plant is accompanied by danger of radioactivity, it is desirable to reduce manpower as low as possible.

The present invention is to provide a hollow member, such as heat exchanger, washing or cleaning device and a method for washing or cleaning the hollow member, where the above described defects in the conventional heat exchanger washing device have been obviated.

Further objects and advantages of the invention will be apparent from the following description of the invention.

SUMMARY OF THE INVENTION

According to a first aspect of the invention, a hollow member, such as heat exchanger, is washed or cleaned. A direction changing member takes a first position where a receiving portion of the direction changing member is communicated at one end with a transfer passage of a cleaning member holding section and is closed at the other end thereof. A cleaning member or washing brush forwarded from the transfer passage of the cleaning member holding section is received in the receiving portion of the direction changing member. Then, the direction changing member assumes a second position where the receiving portion is communicated at one end thereof with a guide passage of a cleaning member guide and communicated at the other end thereof with a passage of a fluid introduction guide.

Under a condition where the front end of the cleaning member guide is inserted into a hollow member, such as a pipe of a heat exchanger, a high pressure fluid is supplied to the fluid introduction guide through the fluid supply means so that the high pressure fluid is applied to a rear portion of the cleaning member to eject the cleaning member, to pass through the guide passage of the cleaning member guide, and to run inside the hollow member, e.g. pipe of the heat exchanger, to thereby discharge substances adhered to the inner wall of the pipe to the outside.

Also, according to the cleaning device of the invention, in addition to the function as stated above, the cleaning members, i.e. washing brushes, are held in the hollow member holding section provided in an upright state. Under the first position where the receiving portion is communicated at one end with the transfer passage and is closed at the other end by an inner wall of a fixed side outer frame, the cleaning member is introduced into a receiving portion by its gravity. By rotating a moving side rotary member by rotating means, the second position where the receiving portion is communicated at one end with the guide passage and at the other end with the fluid introduction guide is taken. Thus, the cleaning member can be introduced into an area where the high pressure fluid flows.

Also, since a holding portion is provided at a front side of the cleaning member guide and the direction changing member is located at a position away from the holding portion, load applied to the holding portion is small.

DETAILED DESCRIPTION OF PREFERRED EMBODIMENTS

Embodiments according to the present invention are explained with reference to the drawings.

Reference numeral 1 represents a hollow member cleaning device, i.e. heat exchanger washing or cleaning device. In the heat exchanger washing device 1, a high pressure fluid is ejected to a cleaning member, i.e. washing brush 10, so that the washing brush 10 runs inside a pipe 11 of a heat exchanger for discharging substances adhered to an inner wall of the pipe 11 to the outside of the pipe 11 to thereby clean the inner wall.

Figure 1:
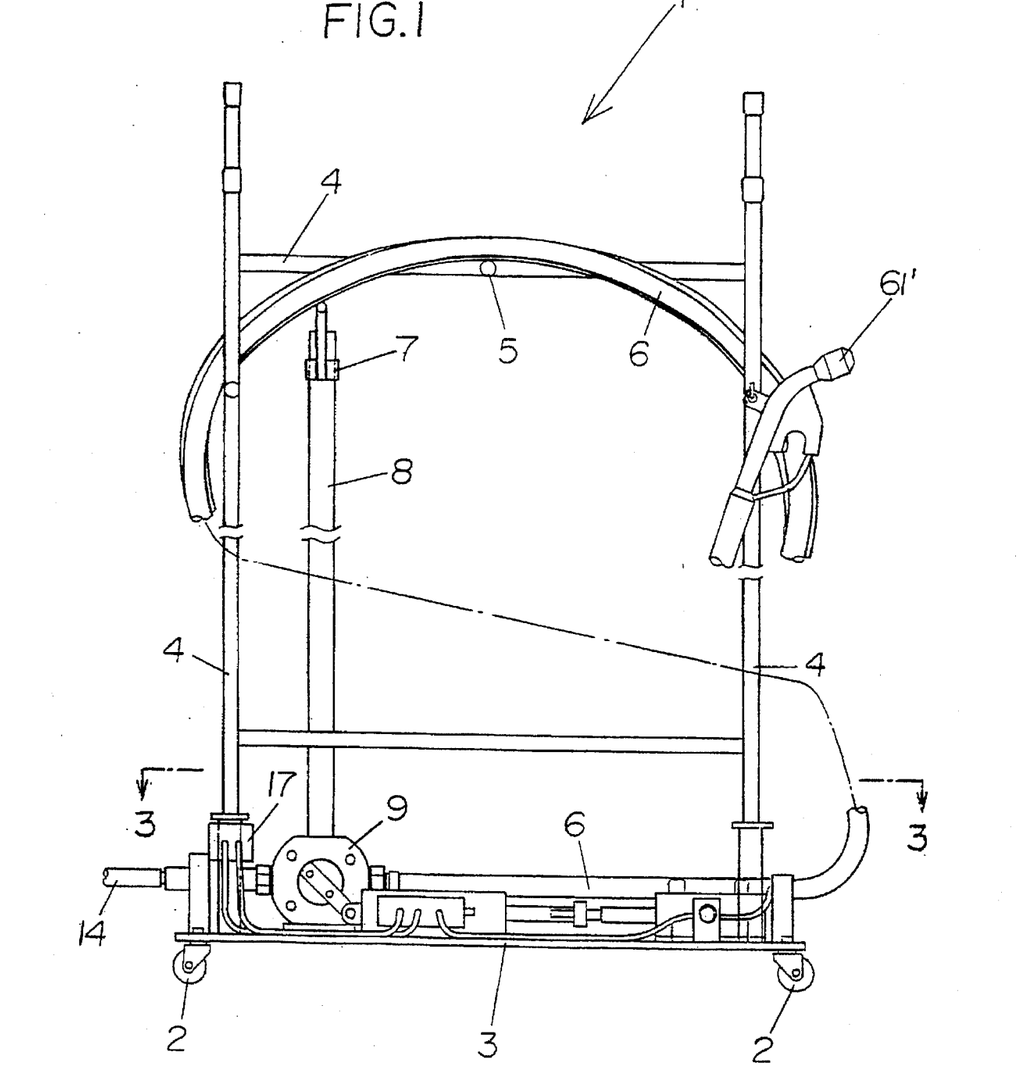
FIG. 1 is a schematic front view showing a heat exchanger washing device of an embodiment according to the present invention.
Figure 2:
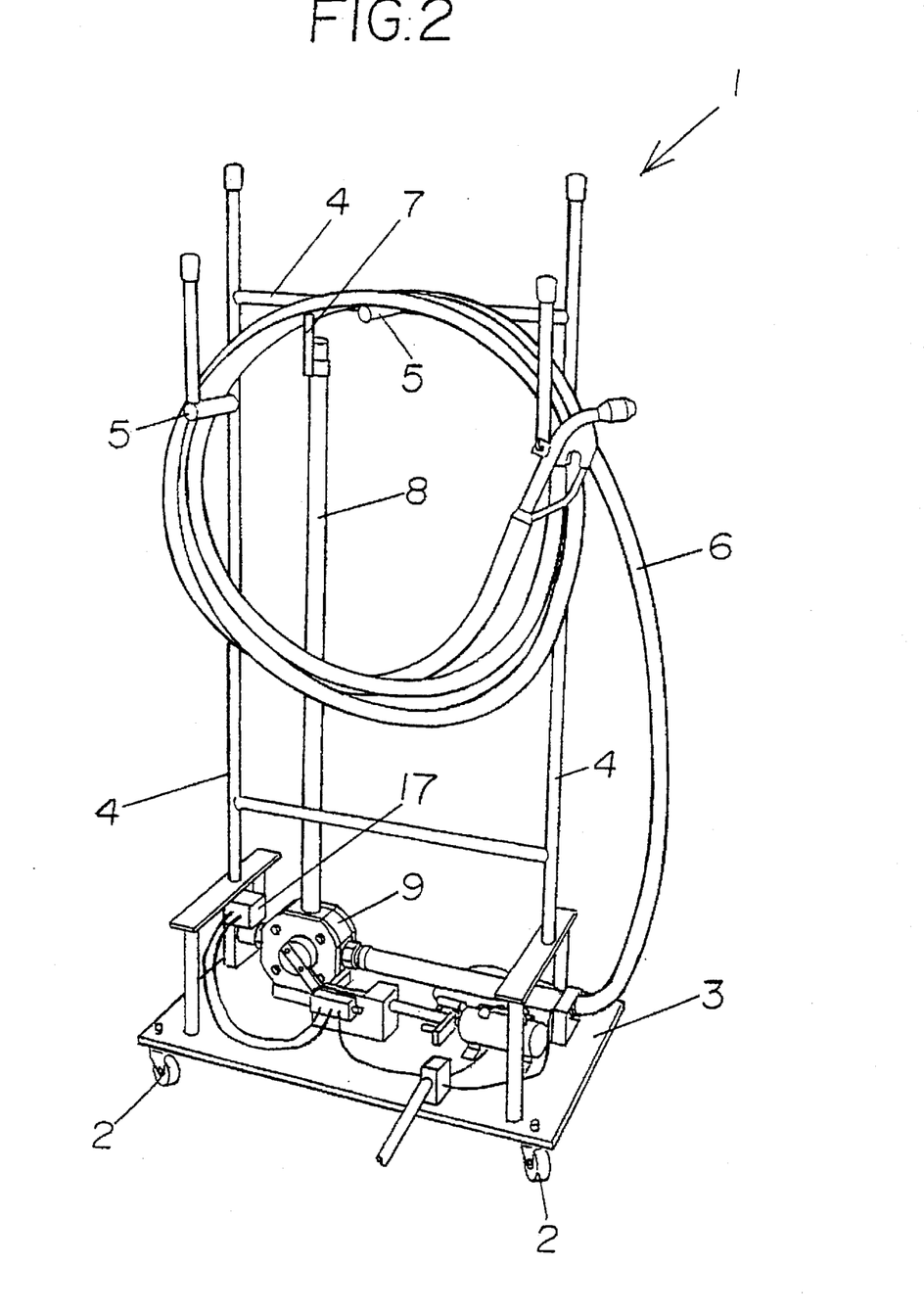
FIG. 2 is a perspective view of the heat exchanger washing device shown in FIG. 1.
Figure 3:
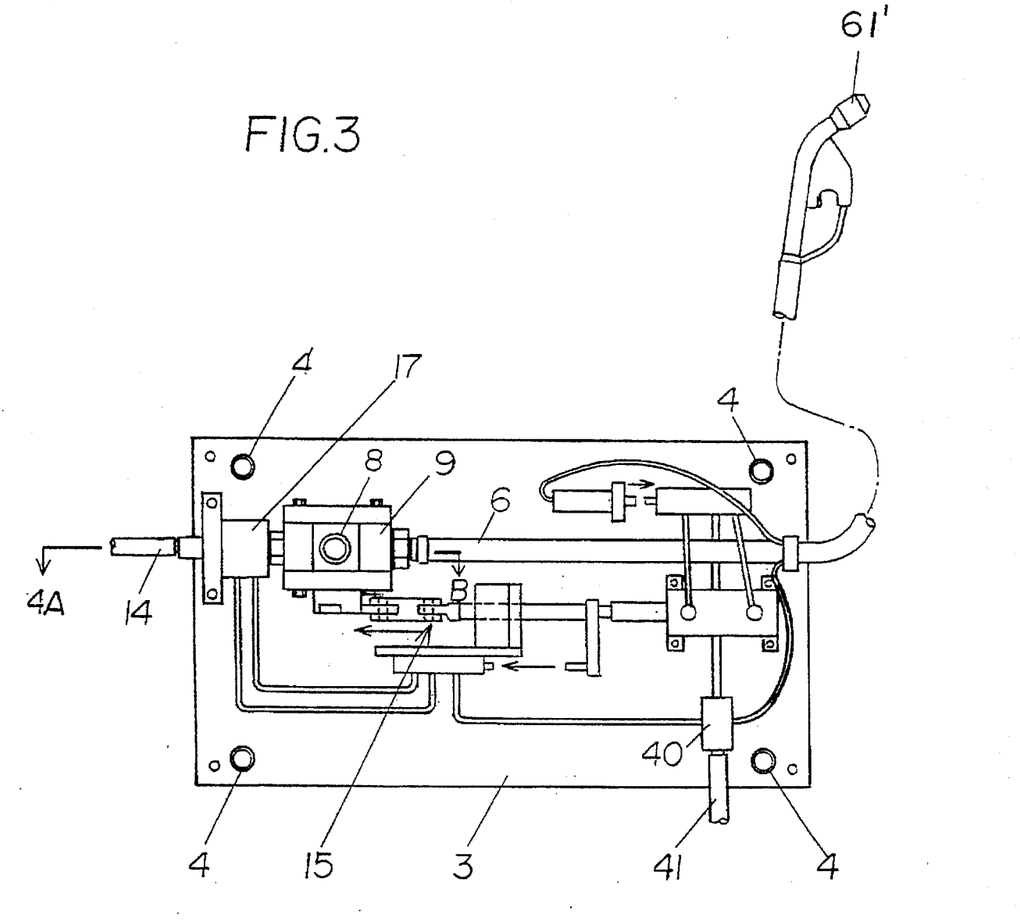
FIG. 3 is a section view taken along line 3—3 in FIG. 1.

As shown in FIGS. 1 and 2, the heat exchanger washing device 1 is mounted on a platform 3 provided with wheels 2.

On the platform 3, a frame 4 is formed to extend upwardly, and transverse supporting bars 5 are attached to the frame 4 at an upper part thereof to extend in a horizontal direction with respect to the upright frame 4. A heat exchanger guide 6 is hung on the transverse supporting bar 5.

Also, a holding member 7 is provided on an upper part of the frame 4, and one end of a washing brush holding section 8 is connected to the holding member 7.

Figure 7:
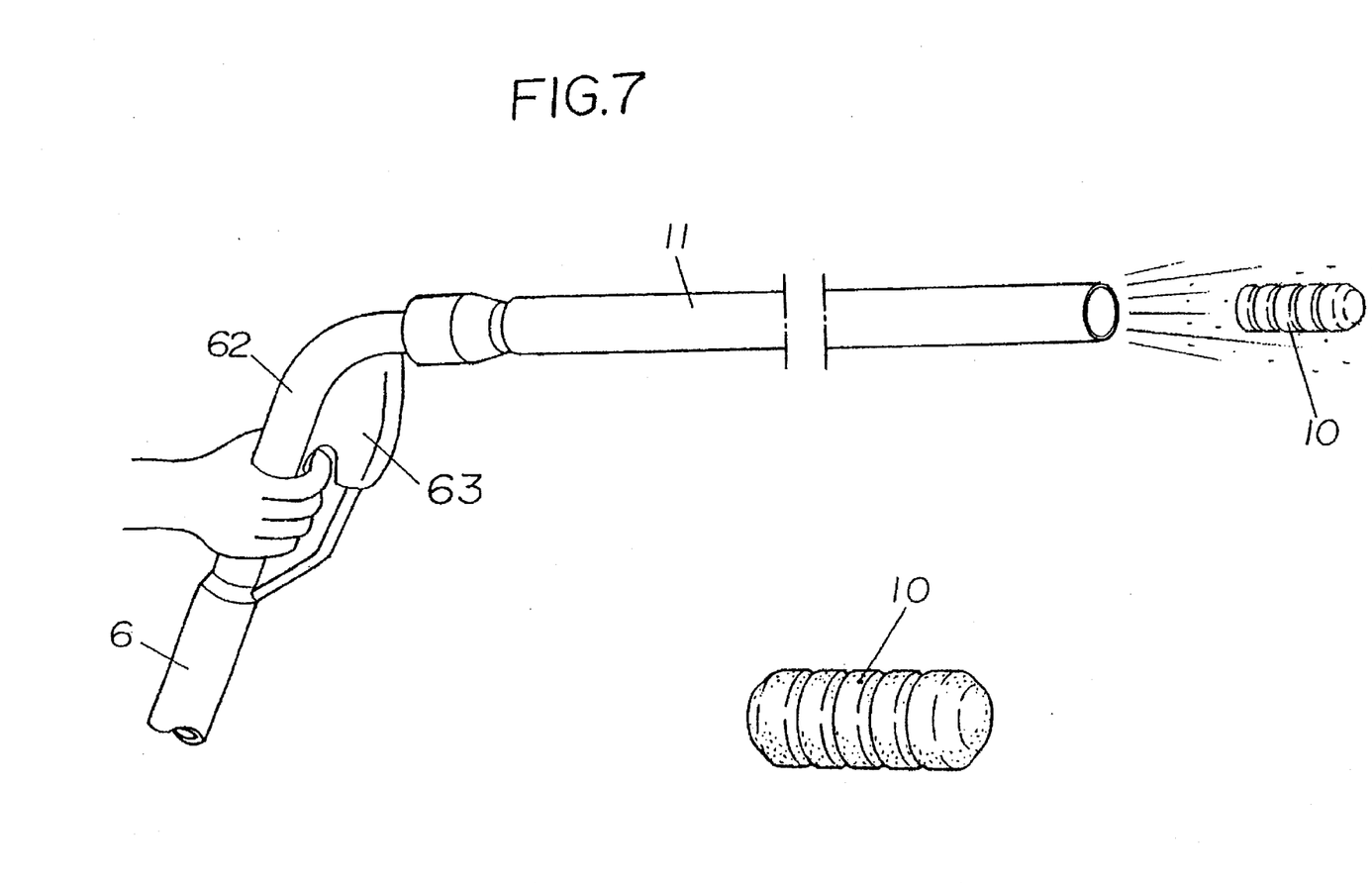
FIG. 7 is a schematic diagram for explaining a washing method of a heat exchanger.

The washing brush holding section 8 holds a plurality of washing brushes 10, shown in FIG. 7, in series in a longitudinal direction, and has a transfer passage for forwarding the washing brushes 10 to a direction changing member 9. The washing brush holding section 8 is, for example, a transparent plastic cylinder so that a holding state of the washing brushes 10 can be seen from an outside, and is disposed uprightly.

When a high pressure fluid is ejected to a rear portion of the washing brush 10, the brush 10 moves or runs in the pipe 11 of the heat exchanger to discharge substances adhered to inner walls of the pipe 11 to the outside thereof. The washing brush 10 is made of, for example, a soft material having elasticity and has approximately a cylindrical shape, as shown in FIG. 7.

The heat exchanger guide 6 is formed of, for example, a flexible hose having a guide passage 61 for guiding the washing brush 10 into the pipe 11 of the heat exchanger. The heat exchanger guide 6 has, at a front end thereof, an insertion portion 61' which is formed in a tapered shape to be easily inserted into the pipe 11 of the heat exchanger, and is connected to the direction changing member 9 at the other end thereof.

Also, the heat exchanger guide 6 is provided near the front end with a holding portion 62 to be held by a hand and a hand switch 63 near the holding portion 62, as shown in FIG. 7.

The hand switch 63, which is described later, switches from a first position of the direction changing member 9 to a second position by means of air by pushing a lever 64, and then controls fluid supply means, not shown, from an OFF-state to an ON-state.

The direction changing member 9, as shown in FIGS. 4A to 6B, changes a direction of the washing brush 10 transferred from the washing brush holding section 8 to the guide passage 61 of the heat exchanger guide 6. The direction changing member 9 faces one end of a fluid introduction guide 14, one end of the transfer passage of the washing brush holding section 8 and a rear end of the heat exchanger guide 6, respectively, and has a penetrated receiving portion 91 for receiving the washing brush 10 therein. The penetrated receiving portion 91 is selectively switched to the first position, as shown in FIGS. 4B and 5A, where the receiving portion 91 is communicated at one end with the transfer passage of the washing brush holding section 8 and is closed at the other end thereof, or the second position, as shown in FIG. 6A, where the receiving portion 91 is communicated at one end with the guide passage 61 of the heat exchanger guide 6 and communicated at the other end thereof with the passage of the fluid introduction guide 14.

Figure 4A:
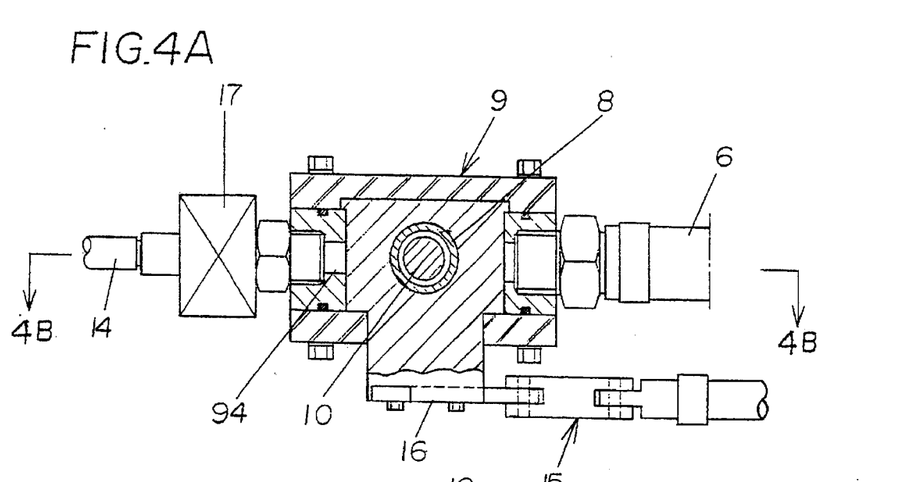
FIG. 4A is a schematic section taken along line 4A—4A in FIG. 3 for explaining an operation state of a direction changing member.
Figure 4B:
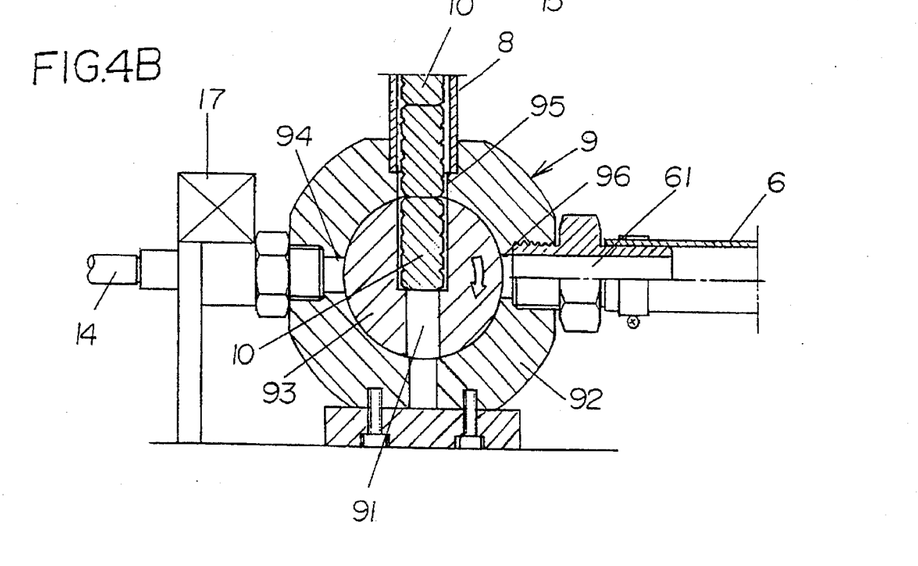
FIG. 4B is a schematic section taken along line 4B—4B in FIG. 4A for explaining an operation state of the direction changing member.

More specifically, the direction changing member 9, as shown in FIG. 4B, is formed of a fixed side outer frame 92 and a moving side rotary member 93. The fixed side outer frame 92 includes a first passage 94 communicated with the end of the fluid introduction guide 14, a second passage 95 communicated with the end of the transfer passage of the washing brush holding section 8, and a third passage 96 communicated with the rear end of the heat exchanger guide 6.

Also, the moving side rotary member 93 is rotatably situated inside the fixed side outer frame 92, and has the penetrated receiving portion 91 to receive the washing brush 10 therein.

Figure 5A:
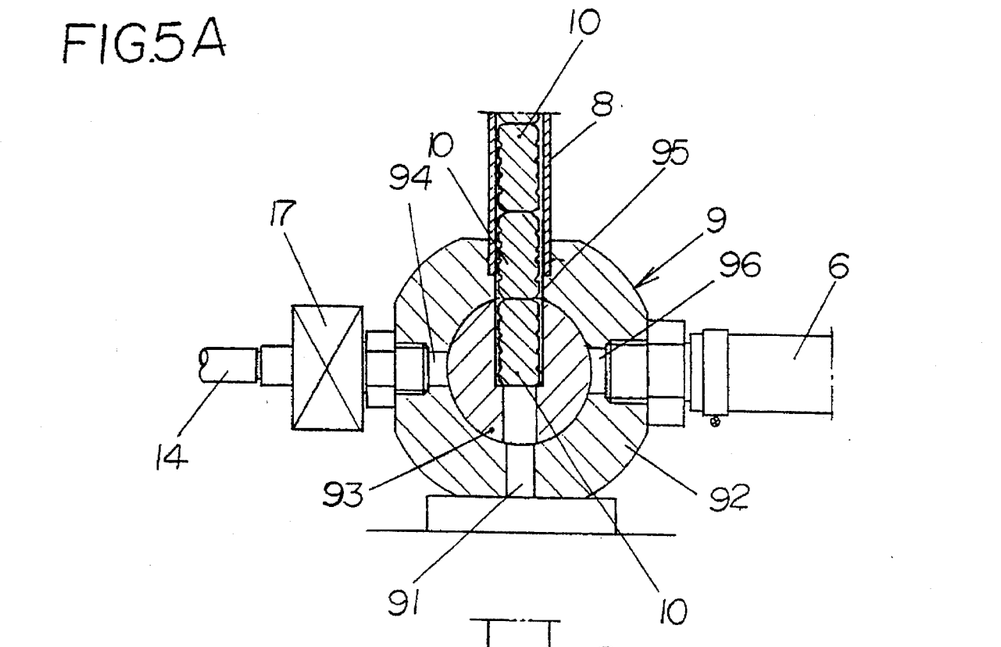
FIG. 5A is a schematic section view similar to FIG. 4A.
Figure 5B:
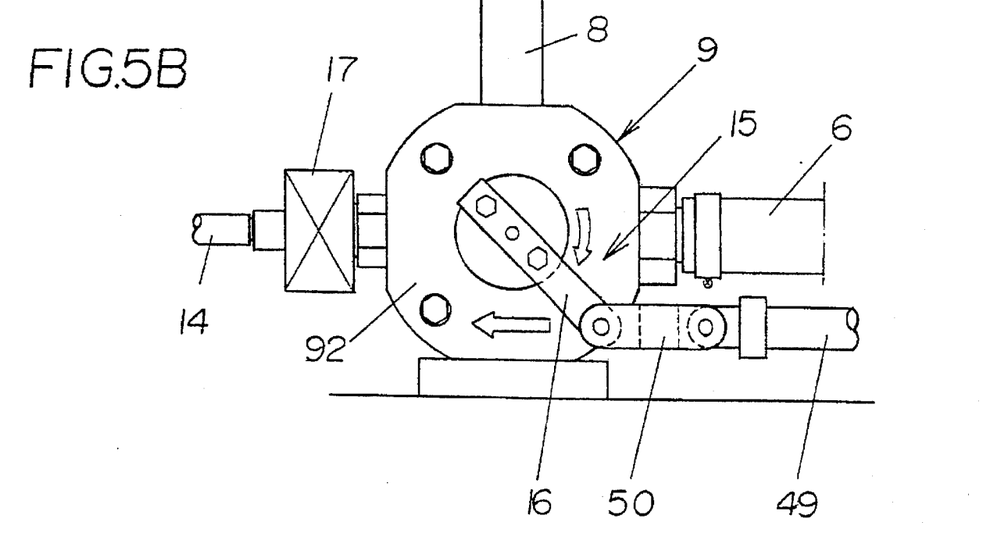
FIG. 5B is a schematic front view showing a front of FIG. 5A.
Figure 6A:
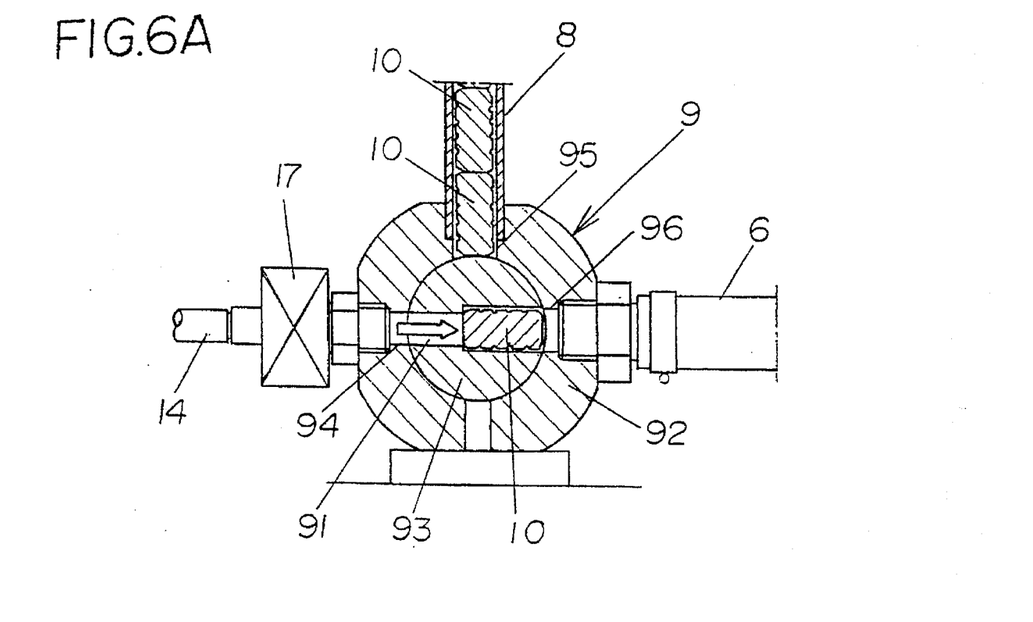
FIG. 6A is a schematic section view of the direction changing member in a second state where the direction changing member shown in FIG. 5A has been rotated.

Incidentally, in the first position of the direction changing member 9, the penetrated receiving portion 91 is communicated at one end thereof with the second passage 95 and is closed at the other end thereof by an inner wall of the fixed side outer frame 92, as shown in FIG. 4B and FIG. 5A. Also, in the second position of the direction changing member 9, the receiving portion 91 is communicated at one end with the first passage 94 and at the other end with the third passage 96, as shown in FIG. 6A.

And, the moving side rotary member 93 of the direction changing member 9 is rotated by a lever 16 which is provided on an outer surface of the moving side rotary member 93 and rotated by rotating means 15.

The fluid introduction guide 14 has a passage for introducing a fluid, such as water and air. The fluid introduction guide 14 is supplied with a high pressure fluid, such as water and air, through fluid supplying means, not shown. Incidentally, as the fluid supplying means, the passage of the fluid introduction guide 14 may be opened and closed by a closing valve 17. On the other hand, a fluid supplying source, not shown, may be controlled ON and OFF to supply the fluid or stop supplying the fluid.

Next, control of the direction changing member 9 and the fluid supplying means, not shown, is described referring to FIGS. 4A to 11.

Figure 8:
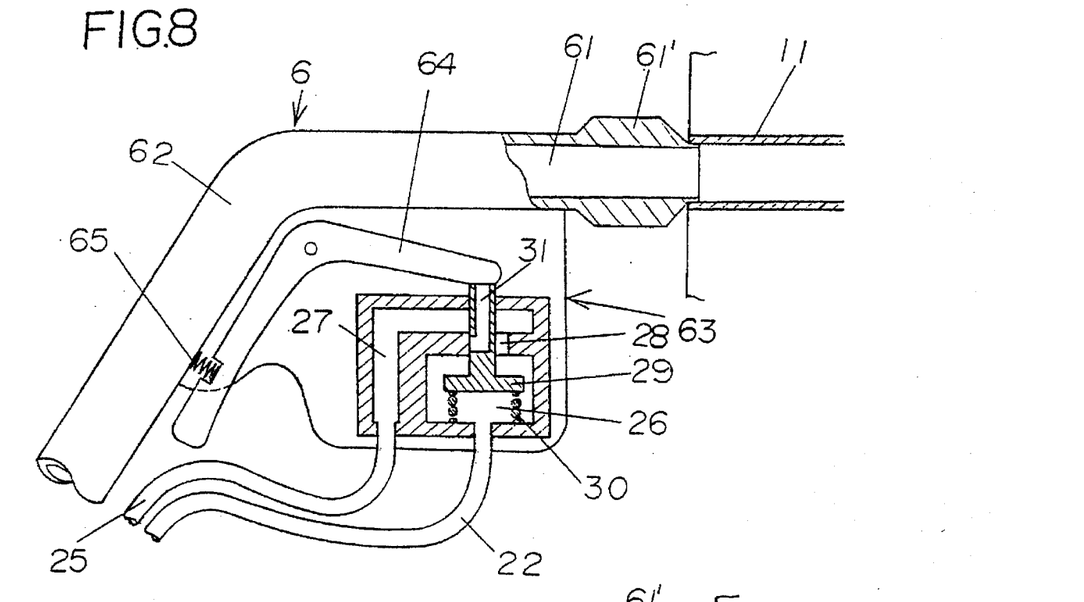
FIG. 8 is an explanatory partial section view for explaining an operation of a hand switch in an ON-state.

Under a condition where the pipe 11 of the heat exchanger is disassembled to form straight portions and the front end of the heat exchanger guide 6 is inserted into the straight portion of the pipe 11 at one side thereof, the hand switch 63 located in the vicinity of the holding portion 62 is pushed or actuated as shown in FIG. 8. Thus, the direction changing member 9 is switched from the first position to the second position, and then a high pressure fluid is supplied to the fluid introduction guide 14 and the heat exchanger guide 6 by the fluid supplying means, not shown. Accordingly, the high pressure fluid is applied to the rear portion of the washing brush 10 to thereby eject the washing brush 10.

Figure 10:
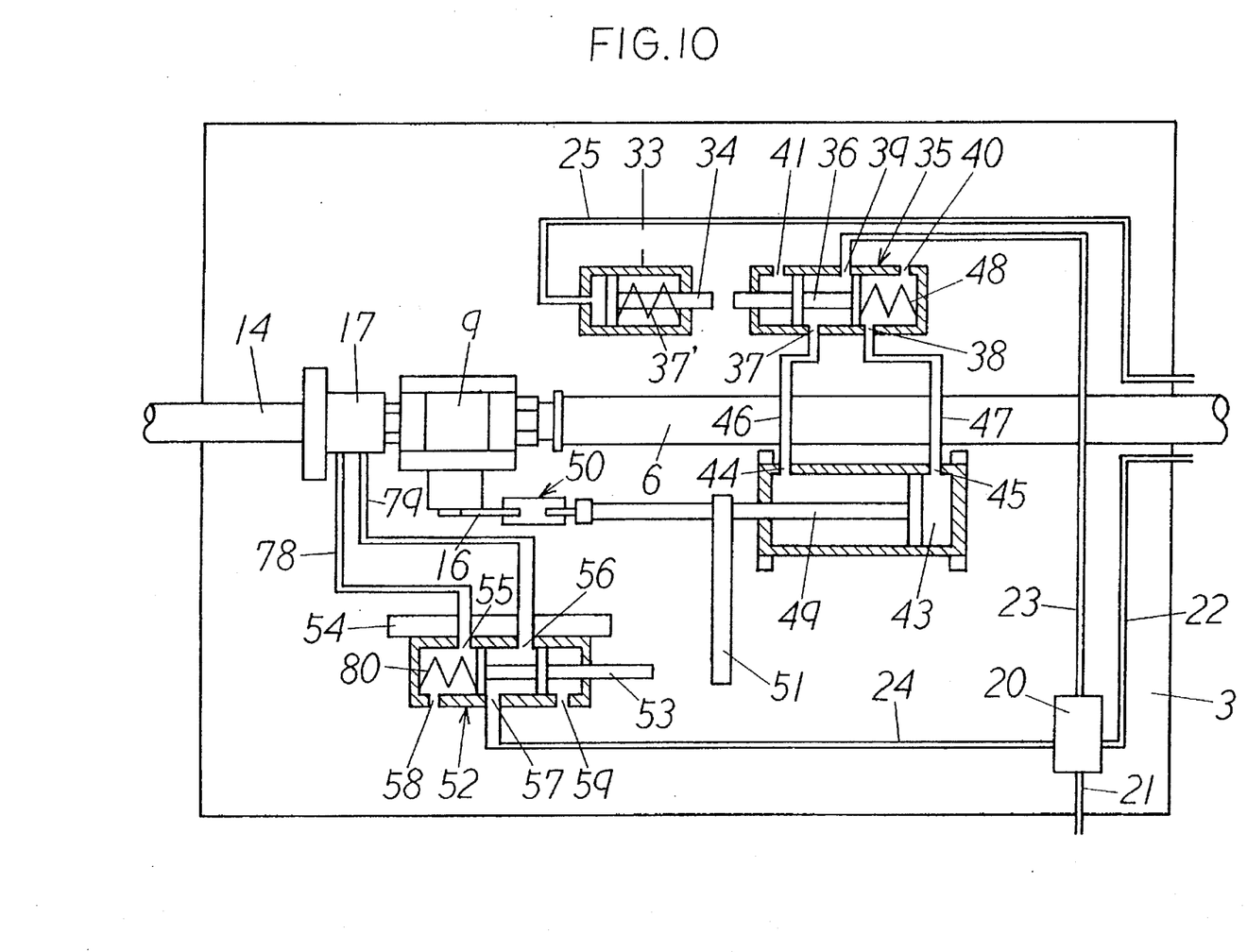
FIG. 10 is an explanatory view for explaining control of the direction changing member and fluid supply means where the hand switch is in the OFF-state.
Figure 11:
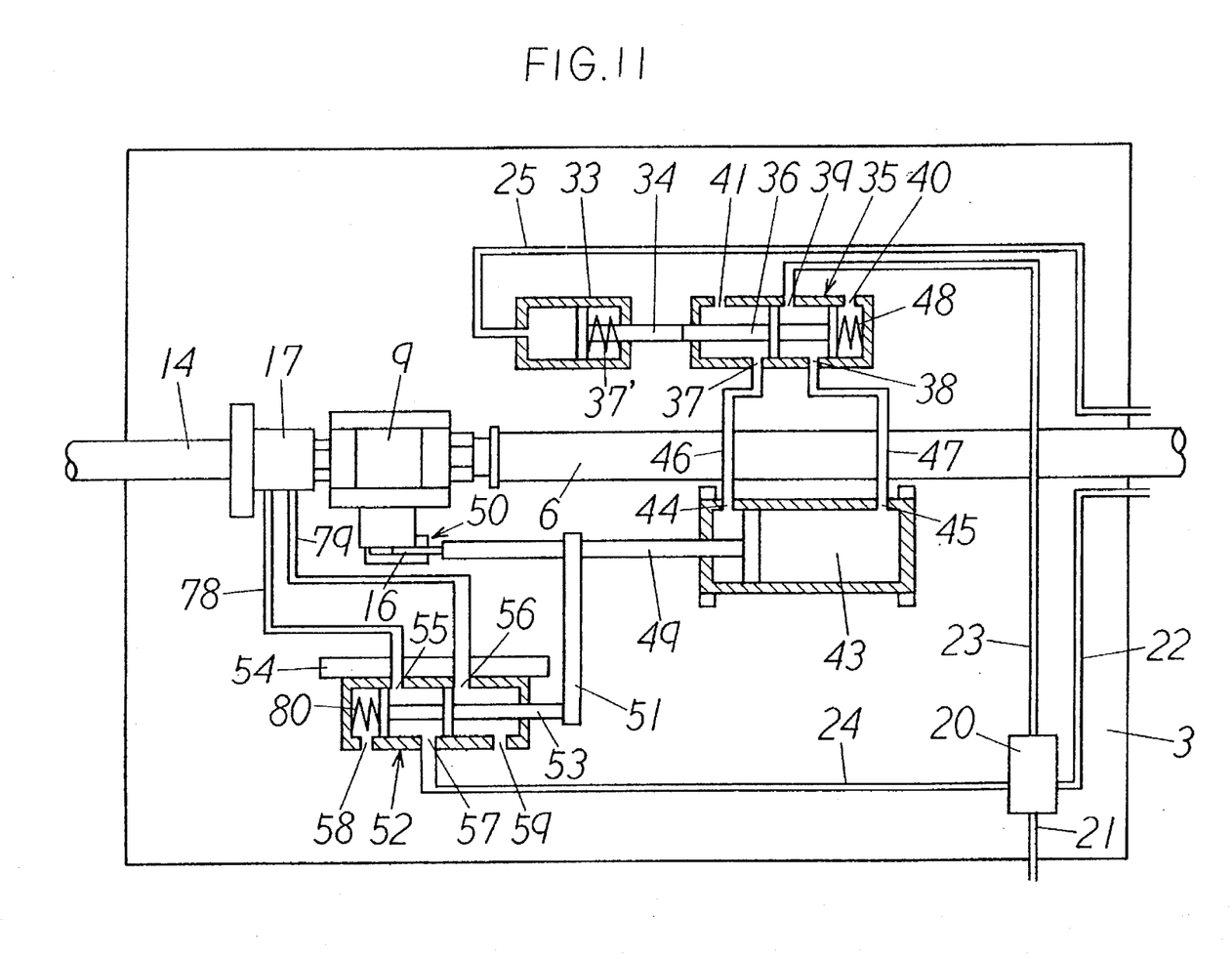
FIG. 11 is an explanatory view for explaining control of the direction changing member and fluid supply means where the hand switch is in the ON-state.

More specifically, FIGS. 10 and 11 are explanatory drawings for explaining control of the direction changing member 9 and the fluid supplying means (not shown), wherein FIG. 10 shows an operation condition where the hand switch 63 is in an OFF-state, and FIG. 11 shows an operation condition where the hand switch 63 is in an ON-state, respectively.

From an air source, e.g. air of 7 $Kg/cm^2$–15 $Kg/cm^2$, which is not shown, air is introduced into a first air passage 21. The first air passage 21 is branched by a dividing member 20 into a second air passage 22, a third air passage 23 and a fourth air passage 24.

Figure 9:
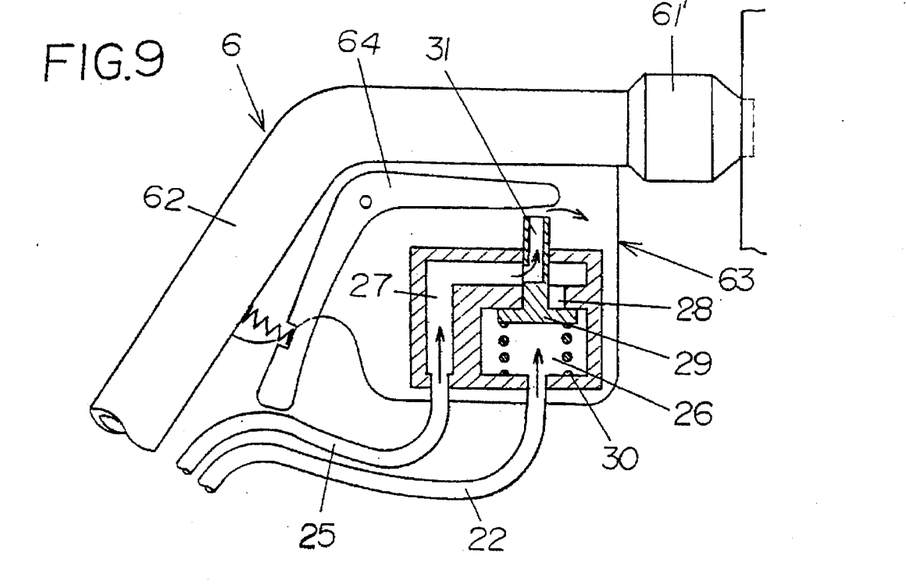
FIG. 9 is an explanatory partial section view for explaining an operation of the hand switch in an OFF-state.

The second air passage 22, as shown in FIGS. 8 and 9, is connected to a fifth air passage 25 through the hand switch 63. The hand switch 63 includes therein an A passage 26 communicated with the second air passage 22 and a B passage 27 communicated with the fifth air passage 25. Also, the A passage 26 and the B passage 27 are communicated with each other through an opening portion 28 provided in an inner portion of the hand switch 63.

Reference numeral 29 is a valve structure for closing and opening the opening portion 28. The valve structure 29 closes the opening portion 28 by the force of a spring 30, and opens the opening portion 28 against the spring 30 when the lever 64 is pushed.

In case the opening portion 28 is closed by the valve structure 29 as shown in FIG. 9, in order to discharge air in the B passage 27 to the outside, a passage 31 is provided in the valve structure 29.

The fifth air passage 25 is connected to a first cylinder 33 at one end thereof as shown in FIGS. 10 and 11. The first cylinder 33 is provided therein with a rod 34 movable in a lateral direction. The rod 34 is provided with a spring 37' urged in a direction away from a rod 36 of a second cylinder 35.

The second cylinder 35 is provided with a port 37, port 38, port 39, port 40 and port 41. The port 37 is connected to a port 44 of a third cylinder 43 through a sixth air passage 46, the port 38 is connected to a port 45 of the third cylinder 43 through a seventh air passage 47, and the port 39 is connected to the third air passage 23, respectively. The port 40 and the port 41 open to atmosphere, and the rod 36 is provided with a spring 48 for urging toward the rod 34 of the first cylinder 33.

A rod 49 of the third cylinder 43 is connected to the lever 16 through a connecting member 50. Also, the rod 49 is provided with a rod operating member 51 at a side portion thereof. The rod operating member 51 operates a rod 53 of a fourth cylinder 52. The fourth cylinder 52 is fixed to a supporting member 54 attached to the platform 3.

The fourth cylinder 52 is provided with a port 55, port 56, port 57, port 58 and port 59. The port 55 is connected to the closing valve 17 through an eighth air passage 78, the port 56 is connected to the closing valve 17 through a ninth air passage 79, and the port 57 is connected to the fourth air passage 24, respectively. The port 58 and port 59 open to atmosphere. The rod 53 is provided with a spring 80 for urging toward the rod operating member 51.

First, as shown in FIG. 8, the holding portion 62 is held by hands, and the front end of the heat exchanger guide 6 is inserted into the pipe 11 of the heat exchanger. Then, the hand switch 63 in the vicinity of the holding portion 62 is pushed. The hand switch 63 is kept pushing until the washing brush 10 is discharged outside the pipe 11.

When the hand switch 63 is pushed, as shown in FIG. 8, the valve structure 29 is pushed by a distal end of the lever 64 to thereby move downward. Therefore, the A passage 26 and the B passage 27 are communicated with each other through the opening portion 28, and air sequentially passes through the first air passage 21, the dividing member 20, the second air passage 22, the A passage 26, the opening portion 28, the B passage 27 and the fifth air passage 25, so that air is applied to one surface of the rod 34 of the first cylinder 33 (refer to FIGS. 8 and 11).

Incidentally, under a condition where the hand switch 63 is open, as shown in FIGS. 9 and 10, air applied to one surface of the rod 34 is discharged outside through the fifth air passage 25, the B passage 27 and the passage 31.

When air is applied, as shown in FIG. 11, an end of the rod 34 abuts against the rod 36 of the second cylinder 35 to thereby move the rod 36 in a lateral direction. As a result, air from the first air passage 21 sequentially passes through the third air passage 23, the port 39, the port 38, the seventh air passage 47 and the port 45, so that air is applied to one surface of the rod 49 of the third cylinder 43 to thereby rotate the lever 16 through the connecting member 50 (refer to FIGS. 6A and 6B).

Incidentally, air applied to the other surface of the rod 49 is discharged outside through the port 44, the sixth air passage 46, the port 37 and the port 41.

Figure 6B:
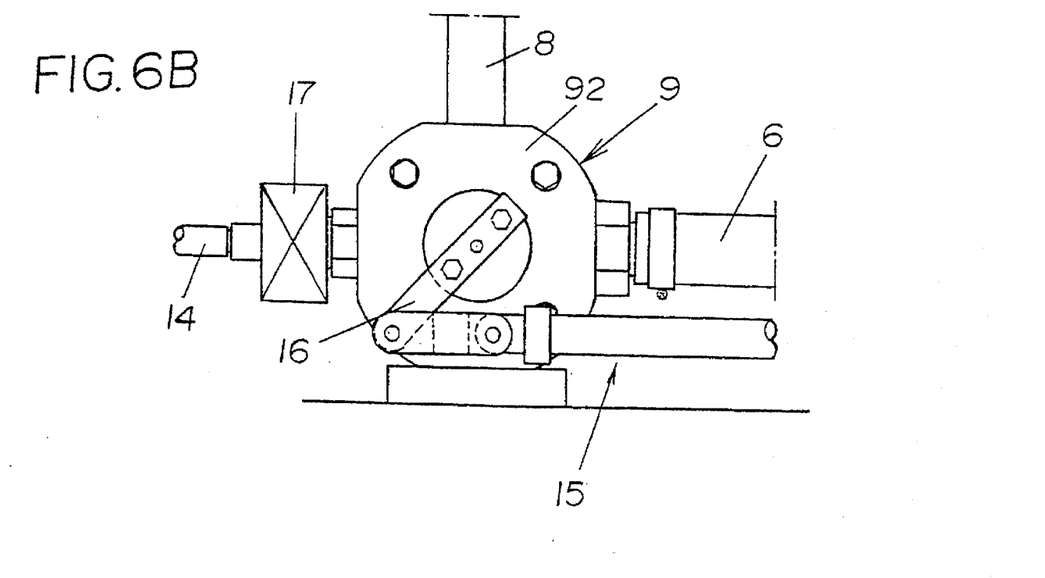
FIG. 6B is a schematic front view showing a front of FIG. 6A.

Through rotation of the lever 16, the direction changing member 9 is shifted from the first position where the receiving portion 91 is communicated at one end with the transfer passage of the washing brush holding section 8 and is closed at the other end thereof (refer to FIGS. 5A and 5B), to the second position where the receiving portion 91 is communicated at one end with the guide passage 61 of the heat exchanger guide 6 and communicated at the other end thereof with the passage of the fluid introduction guide 14 (refer to FIGS. 6A and 6B).

As shown in FIG. 11, when the lever 16 is rotated, the direction changing member 9 is shifted to the second position. As a result, the rod operating member 51 abuts against the rod 53 of the fourth cylinder 52 to move the rod 53 in a lateral direction. Thus, air from the passage 21 is applied to the closing valve 17 through the fourth air passage 24, the port 57, the port 55, and the eighth air passage 78, so that the closing valve 17 is opened.

Air applied to the closing valve 17 is discharged outside through the ninth air passage 79, the port 56 and the port 59.

Incidentally, the closing valve 17 is, as shown in FIG. 11, in an open state where air having passed through the port 5 and the eighth air passage 78 is applied to the closing valve 17, while the closing valve 17 is, as shown in FIG. 10, in a closed state where air having passed through the port 56 and the ninth air passage 79 is applied to the closing valve 17.

Therefore, by pushing the lever 16, the direction changing member 9 is shifted from the first position to the second position, so that the washing brush 10 sent out from the washing brush holding section 8 is changed in its direction to the guide passage 61 of the heat exchanger guide 6. Thereafter, the closing valve 17 is changed to the open state, so that a high pressure fluid is supplied to the fluid introduction guide 14 and the heat exchanger guide 6 by the fluid supply means (not shown). The high pressure fluid is applied to a rear portion of the washing brush 10, so that the washing brush 10 is ejected and passed through the guide passage 61 of the heat exchanger guide 6 to thereby run inside the pipe 11 of the heat exchanger and discharge substances adhered to the inner wall of the pipe 11 to the outside for cleaning the heat exchanger.

In the invention, the heat exchanger washing device includes the heat exchanger guide having the insertion portion 61' at the front end thereof to be inserted into the pipe 11 of the heat exchanger and the guide passage 61 for guiding the washing brush 10 into the pipe 11 of the heat exchanger, and fluid supply means for supplying the high pressure fluid to the guide passage 61. Namely, the heat exchanger guide includes the fluid introduction guide 14 and the heat exchanger guide 6.

In cleaning the heat exchanger, the washing brush 10 is disposed in the guide passage 61 of the heat exchanger guide where supply of the high pressure fluid is stopped, and the high pressure fluid is supplied from the fluid supply means to the heat exchanger guide under a condition that the front end of the heat exchanger guide is inserted into the pipe 11 of the heat exchanger. Thereafter, the high pressure fluid is applied to the rear portion of the washing brush 10 to thereby eject the brush. The brush passes through the guide passage 61 of the heat exchanger guide and runs inside the pipe 11 of the heat exchanger, so that the substances adhered to the inner wall of the pipe 11 are discharged outside the pipe 11.

According to the present embodiment, it is not required that the washing brush is inserted into the pipe of the heat exchanger by hand one by one as practiced in the prior art, so that work load for a worker is reduced and work efficiency is improved.

Also, in the invention, the washing brushes 10 are supplied to the washing brush holding section 8 disposed in the upright state. Thus, the washing brush 10 held in the washing brush holding section 8 falls down into the receiving portion 91 by its gravity when the direction changing member 9 assumes the first position where the receiving portion 91 is communicated at one end with the second passage 95 and is closed at the other end by the inner wall of the fixed side outer frame 92. Then, the moving side rotary member 93 of the direction changing member 9 is rotated by the rotating means 15 to assume the second position where the receiving portion 91 is communicated at one end with the first passage 94 and at the other end with the third passage 96. Accordingly, the washing brush 10 can be introduced into an area where the high pressure fluid flows without using any forced transporting means.

Further, the holding portion 62 is provided at the front end of the heat exchanger guide 6 and the direction changing member 9 is located at a position away from the holding portion 62, so that load applied to the holding portion 62 is reduced and burden to a worker is decreased to thereby improve the work efficiency.

Also, in the present embodiment, by pushing the lever 16, the direction changing member 9 is switched from the first position to the second position by air, and then the fluid supplying means (not shown) is controlled from the Off state to the On state. In addition to the air, for example, the direction changing member 9 may be switched from the first position to the second position by an electric control, such as a relay, and then the fluid supplying means (not shown) may be controlled from the OFF state to the ON state.

Also, it is desirable that the front end of the heat exchanger guide 6 is inserted into the pipe 11 of the heat exchanger at an initial stage of work, and then the lever 16 is pushed. However, at least, the front end of the heat exchanger guide 6 may be inserted into the pipe 11 of the heat exchanger before the direction changing member 9 assumes the second position.

Figure 12:
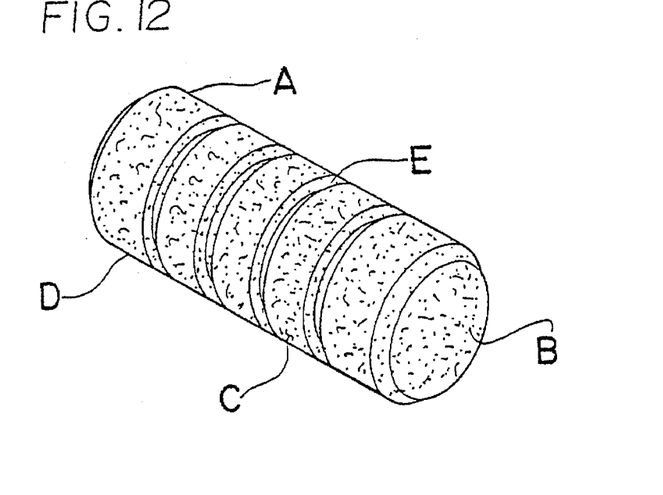
FIG. 12 is an enlarged schematic perspective view of a washing brush shown in FIG. 7.
Figure 13:
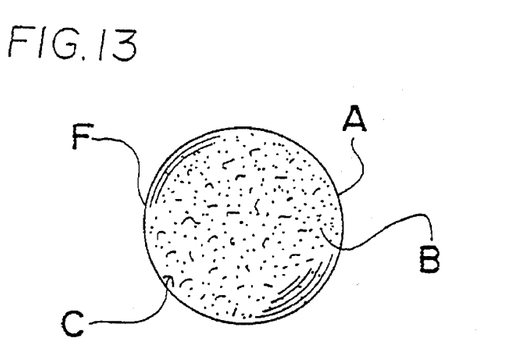
FIG. 13 is a schematic perspective view showing an embodiment of a washing brush other than the washing brush shown in FIG. 12.
Figure 14:
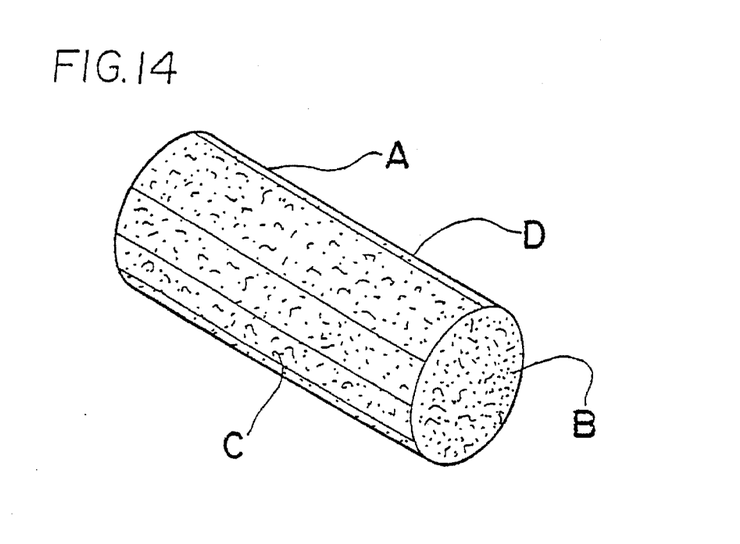
FIG. 14 is a schematic perspective view showing an embodiment of a washing brush other than the washing brush shown in FIG. 13.

The washing brush 10 as shown in FIG. 7 is further explained. As shown in FIGS. 12 to 14, synthetic resin B, such as a soft elastic foamed or solid product, is impregnated with various fibers C, such as synthetic fibers, natural fibers and metal fibers to thereby form a sheet or a block.

For example, in case a washing brush is for cleaning an interior of a cooling pipe of a steam condenser, as shown in FIG. 12, a cylinder D having approximately the same outer diameter as an inner diameter of the cooling pipe may be formed, which is provided with a plurality of grooves E with an appropriate interval in a longitudinal direction for collecting furs, scales and shells adhered to inner walls of the cooling pipe. As shown in FIG. 13, a ball F having approximately the same diameter as the inner diameter of the cooling pipe may be formed, or as shown in FIG. 14, a cylinder D having approximately the same outer diameter as the inner diameter of the cooling pipe may be formed without grooves.

As the kinds of the fibers C, there are a synthetic fiber, natural fiber, metal fiber and so on. The synthetic fiber includes a polyester fiber, nylon fiber, carbon fiber and so on; the natural fiber includes a wool, pig bristle, horse hair and so on; and the metal fiber includes stainless steel fiber, brass fiber, iron fiber and so on.

Also, the synthetic resin B must be soft and elastic, and foamed or solid products are included. The foamed product includes urethane, silicone, natural rubber and so on, and the solid product includes silicone, nitrile rubber (NR), polyurethane and so on.

When a brush for cleaning an interior of a cooling pipe of a condenser is formed, the soft and elastic synthetic resin B, such as a foamed or solid product, is impregnated with various kinds of fibers C, such as a synthetic fiber, a natural fiber and a metal fiber, which are formed into a sheet or block. Since the elasticity of the soft synthetic resin B is superior to that of a conventional synthetic rubber, the synthetic resin B on a cut peripheral surface is pulled inward by stress to thereby leave only the fibers C on the peripheral surface. Thus, the washing brush B has better tearing strength and durability than those of the conventional synthetic rubber brush, and can be made extremely light.

According to the first aspect of the heat exchanger washing device, a direction changing member assumes a first position where a receiving portion is communicated at one end with a transfer passage of a cleaning member holding section and is closed at the other end thereof. The cleaning member or washing brush sent from the transfer passage is received in the receiving portion of the direction changing member. Then, the direction changing member assumes a second position where the receiving portion is communicated at one end with a guide passage of a cleaning member guide and at the other end thereof with a passage of a fluid introduction guide. Under a condition where the front end of the cleaning member guide is inserted into a pipe of a heat exchanger or a hollow member, a high pressure fluid is supplied to the fluid introduction guide through the fluid supplying means so that the high pressure fluid is applied to a rear portion of the cleaning member or washing brush. Therefore, the cleaning member is vigorously ejected to run through the guide passage of the cleaning member guide and the pipe of the heat exchanger to thereby discharge substances adhered to the inner wall of the pipe to the outside of the pipe. Thus, it is not required that the cleaning member is inserted into a pipe of a heat exchanger by hand one by one as in a conventional heat exchanger washing device. The burden to a worker is reduced and work efficiency can be greatly improved.

Also, according to the second aspect of the invention, in addition to the effect in the first aspect, the cleaning member is supplied to the cleaning member holding section, and the direction changing member is shifted from the first position to the second position, so that the cleaning member can be introduced into an area where the high pressure fluid flows without using any forced conveying means.

Also, since the holding portion is provided at the front end side of the cleaning member guide so that the direction changing member is located at a portion away from the holding portion, load applied to the holding portion is reduced and burden to a worker is reduced to thereby improve the work efficiency.

Also, according to a third aspect, i.e. a method for cleaning a hollow member or heat exchanger, a cleaning member is located in a guide passage of the cleaning member guide where supply of high pressure fluid is stopped; and at least under a condition where the front end of the guide passage is inserted into a hollow member or a pipe of the heat exchanger, the high pressure fluid is supplied to the hollow member guide by the fluid supply means so that the high pressure fluid is applied to a rear portion of the cleaning member to eject the same. As a result, the ejected cleaning member vigorously runs through the guide passage of the cleaning member guide and hollow member to thereby discharge substances adhered to the inner wall of the hollow member to outside. Therefore, it is not required that the cleaning member is inserted into a pipe of a heat exchanger by hand one by one as in the prior art, so that burden to a worker is reduced and the work efficiency is greatly improved.

Also, according to a fourth aspect, in addition to the effect as disclosed in the third aspect, by supplying the cleaning member into the cleaning member holding section and shifting the direction changing member from the first position to the second position, the cleaning member can be introduced into an area where the high pressure fluid flows without using any forced conveying means.

Also, the holding portion is disposed at a front side of the cleaning member guide and the direction changing member is located at a position away from the holding portion, so that load applied to the holding portion is small and burden to a worker is decreased to thereby improve the work efficiency.

What is claimed is:

1. A cleaning device for cleaning a hollow member by means of cleaning members and a pressurized fluid, comprising:

a cleaning member holding section having a transfer passage for receiving the cleaning members therein;

a cleaning member guide having a guide passage for guiding one of said cleaning members into the hollow member, front and rear ends, and an inserting portion formed at the front end to be inserted into the hollow member to be cleaned;

a fluid introduction guide having a passage for introducing the fluid;

a direction changing member connected to the transfer passage, the rear end of the cleaning member guide and the fluid introduction guide and having a receiving portion therein, said direction changing member selectively taking one of first and second positions such that in the first position, the receiving portion is communicated at one end with the transfer passage and is closed at the other end thereof, and in the second position, the receiving portion is communicated at one end with the guide passage and at the other end with the fluid introduction guide so that when the pressurized fluid is supplied in the second position to the cleaning member, the cleaning member in the receiving portion is ejected to the hollow member through the guide passage to clean the hollow member; and a control device connected to the direction changing member and having a switch, said control device, when the switch is actuated, allowing the direction changing member in the first position to change to the second position and supplying the pressurized fluid to the direction changing member so that the cleaning member in the receiving portion disposed at the second position is ejected to the hollow member.

2. A cleaning device according to claim 1, wherein said direction changing member includes a fixed frame having ports connected to the transfer passage, the rear end of the cleaning member guide and the fluid introduction guide, and a rotary member rotatably situated in the fixed frame and having the receiving portion for receiving one of the cleaning members at one time, said receiving portion communicating with the transfer passage in the first position and communicating with the cleaning member guide and the fluid introduction guide in the second position.

3. A cleaning device according to claim 2, wherein said control device further includes a valve situated in the fluid introduction guide, said valve being opened when the direction changing member is in the second position and being closed when the direction changing member is in the first position.

4. A cleaning device according to claim 3, wherein the transfer passage of the cleaning member holding section is arranged vertically relative to the fixed frame so that the cleaning members can be supplied to the receiving portion of the rotary member by gravity.

5. A combination of a cleaning device of claim 1 and a cleaning member use for the cleaning device, wherein said cleaning member is formed of a synthetic resin and fibers impregnated therein.

* * * * *